(12) United States Patent
Malecha (10) Patent No.: US 11,008,103 B1
(45) Date of Patent: May 18, 2021

(54) AIRCRAFT CABIN APPARATUS INCLUDING PERSONAL ELECTRONIC DEVICE HOLDER

(71) Applicant: B/E Aerospace, Inc., Winston-Salem, NC (US)

(72) Inventor: Jeremy F. Malecha, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/666,161

(22) Filed: Oct. 28, 2019

(51) Int. Cl.
| | |
|---|---|
| *B64D 11/00* | (2006.01) |
| *B64D 11/06* | (2006.01) |
| *G06F 1/16* | (2006.01) |

(52) U.S. Cl.
CPC .... *B64D 11/00152* (2014.12); *B64D 11/0638* (2014.12); *G06F 1/166* (2013.01)

(58) Field of Classification Search
CPC .. A47C 7/68; A47C 7/70; B60N 3/004; B64D 11/0638
USPC ........... 108/44; 297/146; 248/455, 454, 457
See application file for complete search history.

(56) References Cited

U.S. PATENT DOCUMENTS

| | | | | |
|---|---|---|---|---|
| 889,526 A | * | 6/1908 | James ................ | B64D 11/0638 297/146 |
| 1,303,280 A | * | 5/1919 | Fliedner ................ | A47B 17/02 108/3 |
| 1,839,291 A | * | 1/1932 | Barbour ................ | A47B 23/00 312/233 |
| 3,773,154 A | * | 11/1973 | Mitchell ............. | A47B 23/043 190/11 |
| 4,116,413 A | * | 9/1978 | Andersen ............. | A47B 23/043 248/451 |
| 4,458,370 A | * | 7/1984 | Fickler ................ | A47C 20/048 248/118 |
| 4,592,285 A | * | 6/1986 | Egli ....................... | A47B 27/00 108/23 |
| 4,978,096 A | | 12/1990 | Struckmann | |
| 4,985,602 A | * | 1/1991 | Kouhia .................. | G06F 3/041 108/23 |
| 5,454,581 A | * | 10/1995 | Ringer .................... | A61G 5/10 108/38 |

(Continued)

FOREIGN PATENT DOCUMENTS

| | | |
|---|---|---|
| CN | 103072694 B | 11/2014 |
| CN | 202698258 U | 1/2015 |

(Continued)

*Primary Examiner* — Jose V Chen
(74) *Attorney, Agent, or Firm* — Suiter Swantz pc llo (57) ABSTRACT

An aircraft cabin apparatus may include a top section, a bottom section, and at least one linkage assembly configured to support the top section in an open position following a rotation of the top section between a closed position and the open position. The top section may include a top surface configured to engage a first edge or surface of a laptop and a support structure proximate to the top surface and configured to engage a second edge or surface of the laptop. The bottom section may include two raised portions along each short edge of the bottom section and a cavity defined by the two raised portions. The top section may be configured to fit within the cavity defined within the bottom section when in the closed position, and may be set at an angle relative to the bottom section when in the open position.

15 Claims, 9 Drawing Sheets

(56) References Cited

U.S. PATENT DOCUMENTS

| | | | |
|---|---|---|---|
| 6,237,994 B1 | 5/2001 | Bentley et al. | |
| 6,702,375 B1 * | 3/2004 | Laskowski | B60N 2/206 |
| | | | 273/236 |
| 7,073,449 B2 | 7/2006 | Pipkin | |
| 7,178,871 B1 | 2/2007 | Round et al. | |
| 7,419,211 B2 | 9/2008 | Schikora | |
| 7,923,964 B2 | 4/2011 | Lin et al. | |
| 8,322,290 B1 | 12/2012 | Mignano | |
| 8,369,082 B2 | 2/2013 | Madonna et al. | |
| 8,424,464 B2 | 4/2013 | Korpi | |
| 8,624,547 B2 | 1/2014 | Thorsen et al. | |
| 8,667,904 B2 | 3/2014 | Pajic | |
| 8,763,976 B1 | 7/2014 | Jachim | |
| 8,794,162 B2 | 8/2014 | Hisata et al. | |
| 8,826,830 B2 | 9/2014 | Pajic | |
| 8,905,470 B2 * | 12/2014 | Shih | B60N 3/004 |
| | | | 297/163 |
| 8,934,063 B2 | 1/2015 | Boyer, Jr. | |
| 8,991,319 B2 | 3/2015 | Korpi | |
| 9,067,682 B2 | 9/2015 | Pajic | |
| 9,156,555 B2 * | 10/2015 | Shih | H05K 7/18 |
| 9,167,905 B2 | 10/2015 | Pajic | |
| 9,168,876 B2 | 10/2015 | Pajic | |
| 9,242,733 B2 | 1/2016 | Pajic | |
| 9,403,596 B2 | 8/2016 | Pajic | |
| 9,409,647 B2 | 8/2016 | Pajic | |
| 9,481,465 B2 | 11/2016 | Pajic | |
| 9,623,971 B2 | 4/2017 | Pajic | |
| 9,701,234 B2 | 7/2017 | Pajic | |
| 9,701,409 B2 | 7/2017 | Valdes et al. | |
| 9,758,249 B2 * | 9/2017 | Zheng | B64D 11/06 |
| 9,796,344 B2 | 10/2017 | Pajic | |
| 9,919,802 B2 | 3/2018 | Stephens et al. | |
| 10,137,991 B2 | 11/2018 | Darbyshire et al. | |
| 10,301,028 B2 | 5/2019 | Stephens et al. | |
| 2001/0003961 A1 | 6/2001 | Hodge et al. | |
| 2003/0184957 A1 | 10/2003 | Stahl | |
| 2003/0230674 A1 * | 12/2003 | Weekly | B64D 45/0015 |
| | | | 244/129.1 |
| 2005/0178297 A1 | 8/2005 | Pipkin | |
| 2006/0075934 A1 | 4/2006 | Ram | |
| 2007/0283855 A1 | 12/2007 | Pozzi | |
| 2009/0166504 A1 * | 7/2009 | Lorenzatti | A47B 23/044 |
| | | | 248/444.1 |
| 2010/0315041 A1 | 12/2010 | Tan | |
| 2014/0373758 A1 * | 12/2014 | Pajic | B64D 11/0624 |
| | | | 108/3 |
| 2015/0291073 A1 | 10/2015 | Pajic | |
| 2016/0023618 A1 | 1/2016 | Pajic | |
| 2016/0023766 A1 | 1/2016 | Pajic | |
| 2016/0039525 A1 | 2/2016 | Pajic | |
| 2016/0114891 A1 | 4/2016 | Pajic | |
| 2016/0298808 A1 | 10/2016 | Boyer | |
| 2017/0060186 A1 | 3/2017 | Eliyahu | |
| 2017/0166141 A1 | 6/2017 | Pajic | |
| 2017/0217349 A1 | 8/2017 | Pajic | |
| 2017/0305321 A1 | 10/2017 | Pajic | |
| 2018/0043841 A1 | 2/2018 | Pajic | |
| 2018/0281299 A1 * | 10/2018 | Maslakow | B29D 24/002 |
| 2018/0281966 A1 | 10/2018 | Chuang et al. | |
| 2019/0225131 A1 | 7/2019 | Bellamy et al. | |

FOREIGN PATENT DOCUMENTS

| | | | |
|---|---|---|---|
| CN | 205083041 U | 3/2016 | |
| CN | 105691266 A | 6/2016 | |
| CN | 103358958 B | 12/2016 | |
| CN | 105263802 B | 9/2017 | |
| CN | 207644647 U | 7/2018 | |
| DE | 202013102887 U1 * | 7/2013 | B60N 3/004 |
| DE | 102016000818 A1 * | 7/2016 | B60R 11/02 |
| JP | 3170562 U | 8/2011 | |
| JP | 2014073699 A | 4/2014 | |
| WO | WO-0002745 A1 * | 1/2000 | B64D 11/0638 |
| WO | 2017147620 A1 | 8/2017 | |
| WO | 2018096340 A1 | 5/2018 | |
| WO | WO-2018183786 A1 * | 10/2018 | B60N 3/004 |

* cited by examiner

AIRCRAFT CABIN APPARATUS INCLUDING PERSONAL ELECTRONIC DEVICE HOLDER

BACKGROUND

Aircraft cabins typically include a seat back-mounted tray. Depending on a position of an aircraft seat to which the seat back-mounted tray is coupled and/or a size of a seat occupant attempting to support a personal electronic device with the seat tray. In this case, the personal electronic device may not be fully-opened for review by the seat occupant. In addition, the personal electronic device may not be adequately supported by the seat tray.

SUMMARY

An apparatus for an aircraft cabin of an aircraft is disclosed, in accordance with one or more embodiments of the disclosure. The apparatus may include a top section. The top section may include a top surface configured to engage a first edge or surface of a laptop. The top section may include a support structure proximate to the top surface. The support structure may be configured to engage a second edge or surface of the laptop. The apparatus may include a bottom section. The bottom section may include two raised portions along each short edge of the bottom section. Each of the two raised portions may be configured to receive an arm of a set of arms coupled to an aircraft seat installed in the aircraft cabin of the aircraft. The bottom section may include a cavity defined by the two raised portions. The cavity may open to a surrounding environment for at least a portion of each long edge of the bottom section. The apparatus may include at least one linkage assembly configured to support the top section in an open position following a rotation of the top section relative to the bottom section between a closed position and the open position. The top section may be configured to fit within the cavity defined within the bottom section when in the closed position. The top section may be set at an angle relative to the bottom section when in the open position.

In some embodiments, the top surface may share a plane with a top surface of each of the two raised portions when the top section is within the cavity in the closed position.

In some embodiments, the at least one linkage assembly may include one or more arms. Each arm of the one or more arms may be coupled to a surface of the top section or the bottom section via a hinge assembly.

In some embodiments, the one or more arms may include a first arm and a second arm coupled together via a main hinge assembly. The first arm may be coupled to the top section via a secondary hinge assembly and the second arm may be coupled to the bottom section via another secondary hinge assembly.

In some embodiments, the at least one linkage assembly may include an actuation inhibitor configured to prevent the main hinge assembly coupling the two arms together from actuating beyond a selected angle.

In some embodiments, the actuation inhibitor may be configured to prevent the main hinge assembly coupling the two arms together from actuating beyond a selected angle when the top section rotates from the closed position to the open position.

In some embodiments, the actuation inhibitor may be configured to prevent the main hinge assembly coupling the two arms together from actuating from the open position to the closed position without an external force.

In some embodiments, the linkage assembly may be configured to collapse into the cavity defined by the bottom section and underneath the top section when the top section rotates from the open position to the closed position.

In some embodiments, the apparatus may be configured to transition between a raised position and a lowered position via the set of arms.

In some embodiments, the apparatus may be configured to transition between a collapsed position and an extended position via the set of arms, the collapsed position and the extended position each being variations of the lowered position.

In some embodiments, the support structure may be integrated with the top surface via one or more fabrication processes.

In some embodiments, the support structure may be coupled to the top surface via at least one of an interlocking assembly, a fastener, or an adhesive.

An apparatus for a vehicle is disclosed, in accordance with one or more embodiments of the disclosure. The apparatus may include a top section. The top section may include a top surface configured to engage a first edge or surface of a personal electronic device. The top section may include a support structure proximate to the top surface. The support structure may be configured to engage a second edge or surface of the personal electronic device. The apparatus may include a bottom section. The bottom section may include two raised portions along each short edge of the bottom section. Each of the two raised portions may be configured to receive an arm of a set of arms coupled to a surface within the vehicle. The bottom section may include a cavity defined by the two raised portions. The cavity may open to a surrounding environment for at least a portion of each long edge of the bottom section. The apparatus may include at least one linkage assembly configured to support the top section in an open position following a rotation of the top section relative to the bottom section between a closed position and the open position. The top section may be configured to fit within the cavity defined within the bottom section when in the closed position. The top section may be set at an angle relative to the bottom section when in the open position.

In some embodiments, the vehicle may include an aircraft. The apparatus may be installed within an aircraft cabin of the aircraft.

In some embodiments, the personal electronic device may include a laptop.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1 a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5B generally illustrate an aircraft cabin apparatus including a personal electronic device holder, in accordance with one or more embodiments of the disclosure.

Select seat back-mounted trays include a holder for a personal electronic device such as a tablet, laptop, or the like. These personal electronic device holders may segment the seat back-mounted tray, or otherwise prevent the seat back-mounted tray from including a smooth surface. In addition, these personal electronic device holders may not be self-closing when returning the seat back-mounted tray to an upright position via a linkage assembly, creating a risk of the possible damage to the seat back-mounted tray or components of the seat back-mounted tray, damage to the seat to which the personal electronic device holder is coupled, and/or injury to the user utilizing the personal electronic device holder. Further, these personal electronic device holders may include a clamp or slot that engages the personal electronic device, such that the personal electronic device holder may be limited to select size, shape, and/or configuration of the personal electronic devices.

Where the personal electronic device is a laptop, aircraft seats are not currently designed to allow for the use of many laptops on a tray table during flight, whether due to the reclining of the aircraft seat to which the tray table is attached and/or due to the size of the seat occupant attempting to use a laptop on the tray table during flight. In this instance, the laptop screen may be only partially opened, preventing the individual using the laptop from seeing the full screen. To accommodate this, a user may have to instead use their laptop on their lap, which may cause the laptop to sit lower than a pivot point of the tray table and may result in injury (e.g., neck pain, or the like).

In addition, many laptops may be nearly matching in size or oversized with respect to a top surface of the tray table, rendering the top surface largely unusable for anything other than the laptop when the laptop is out and in use. Previous solutions may have implemented complicated fold systems, creating a complex and potentially easily breakable assembly.

As such, it would be beneficial to provide an aircraft cabin apparatus including a personal electronic device holder that is simple, robust, and configured to allow a seat occupant to use both the personal electronic device holder and any remainder of the top surface of the tray table.

FIGS. 1-5B generally illustrate an aircraft cabin apparatus 100 including a personal electronic device holder 102, in accordance with one or more embodiments of the disclosure. It is noted herein that "aircraft cabin apparatus 100" and variants of the term "aircraft cabin apparatus 100" (e.g., "cabin apparatus 100," "apparatus 100," or the like) may be considered equivalent for purposes of the present disclosure.

Figure 1:
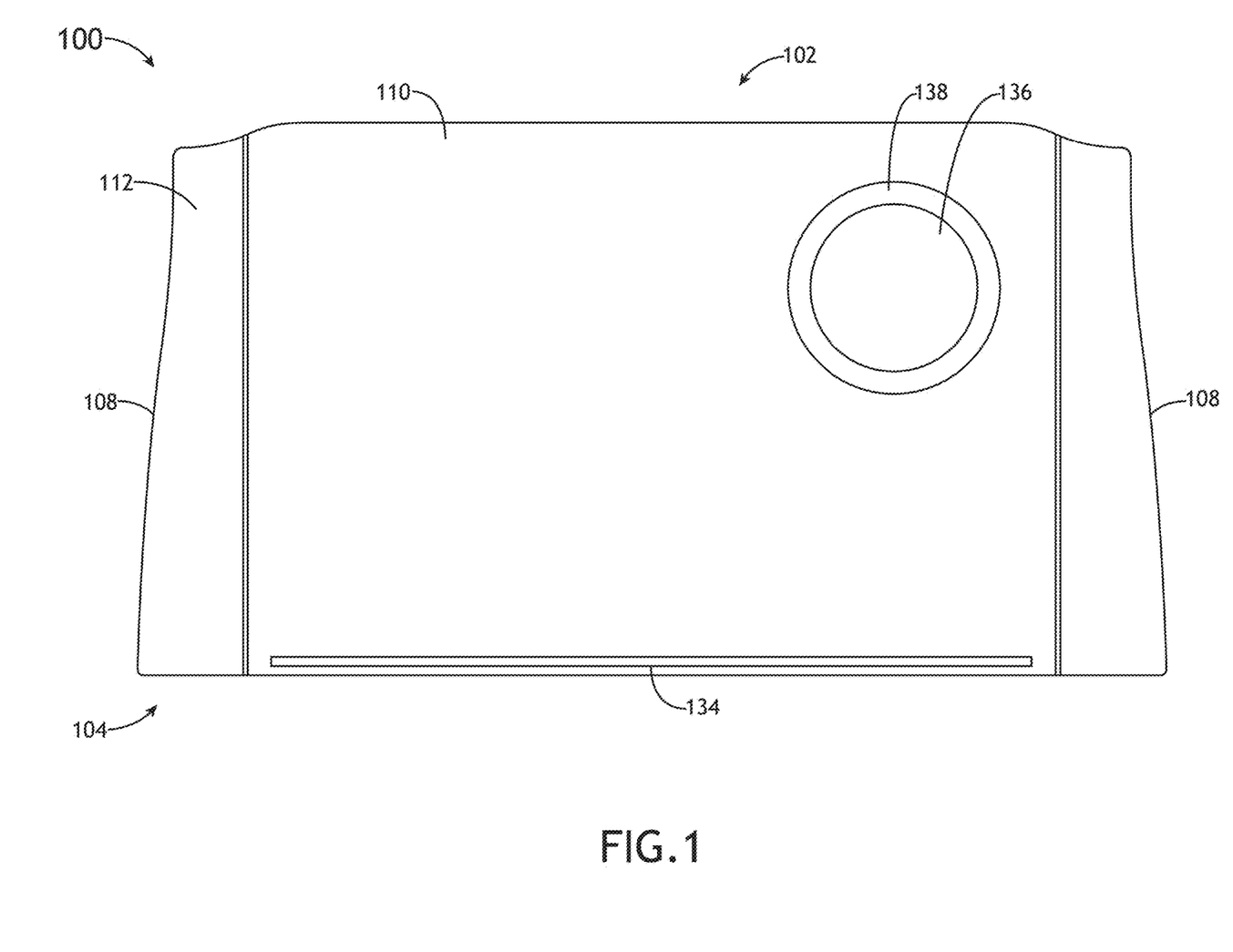
FIG. 1 is a top plan view of an aircraft cabin apparatus including a personal electronic device holder, in accordance with one or more embodiments of the disclosure.
Figure 2A:
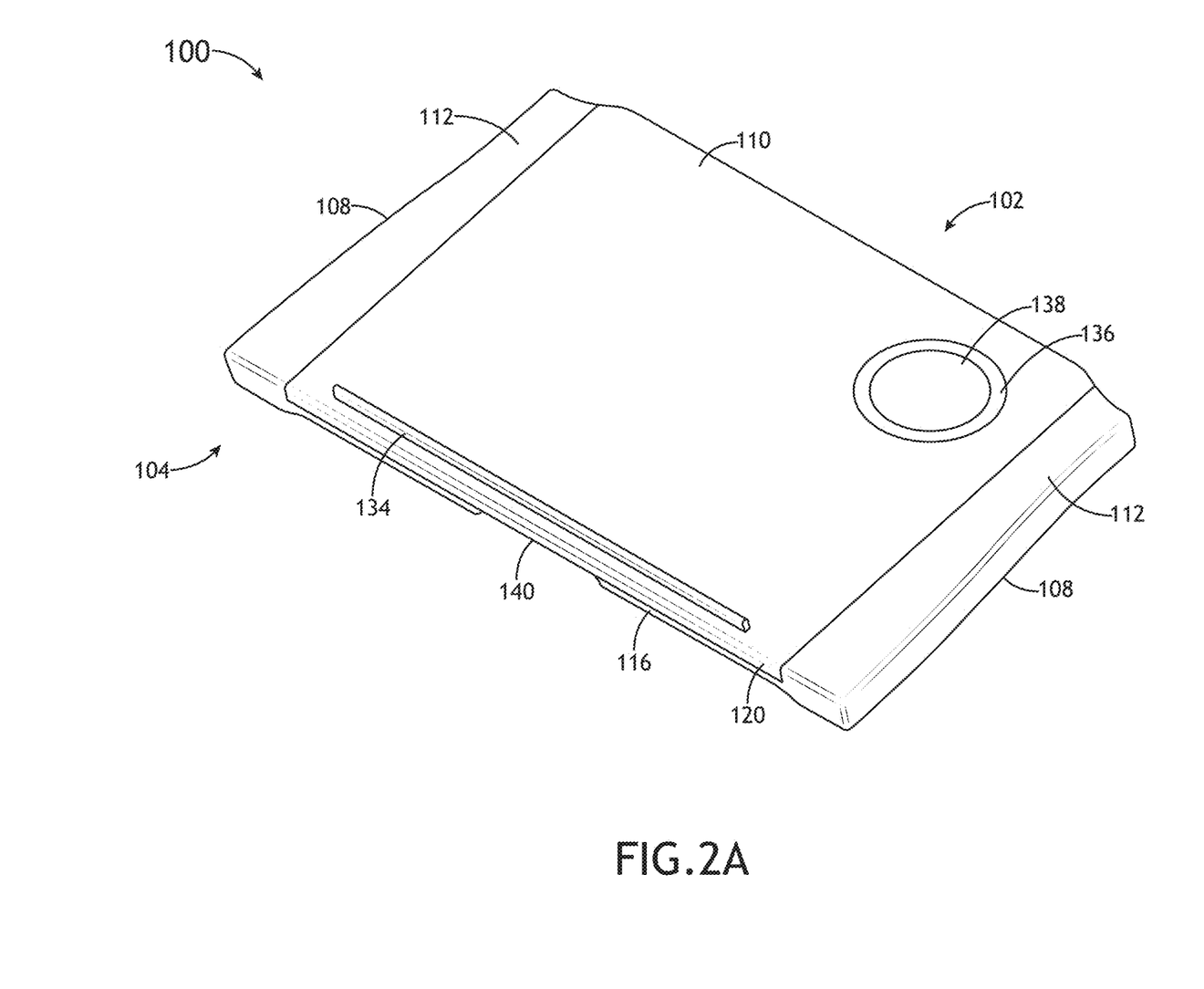
FIG. 2A is a perspective view of an aircraft cabin apparatus including a personal electronic device holder in a closed position, in accordance with one or more embodiments of the disclosure.
Figure 2B:
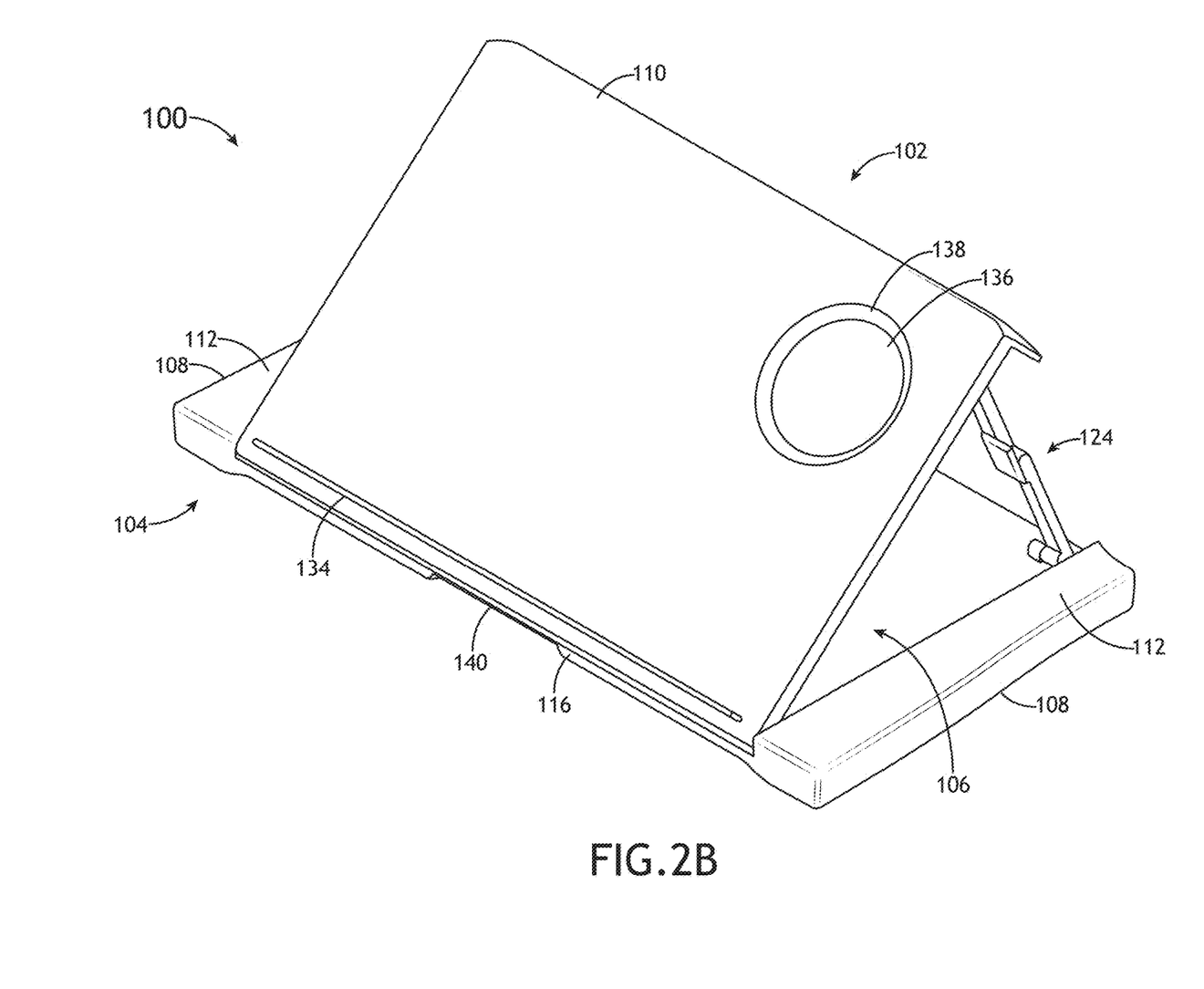
FIG. 2B is a perspective view of an aircraft cabin apparatus including a personal electronic device holder in an open position, in accordance with one or more embodiments of the disclosure.
Figure 3A:
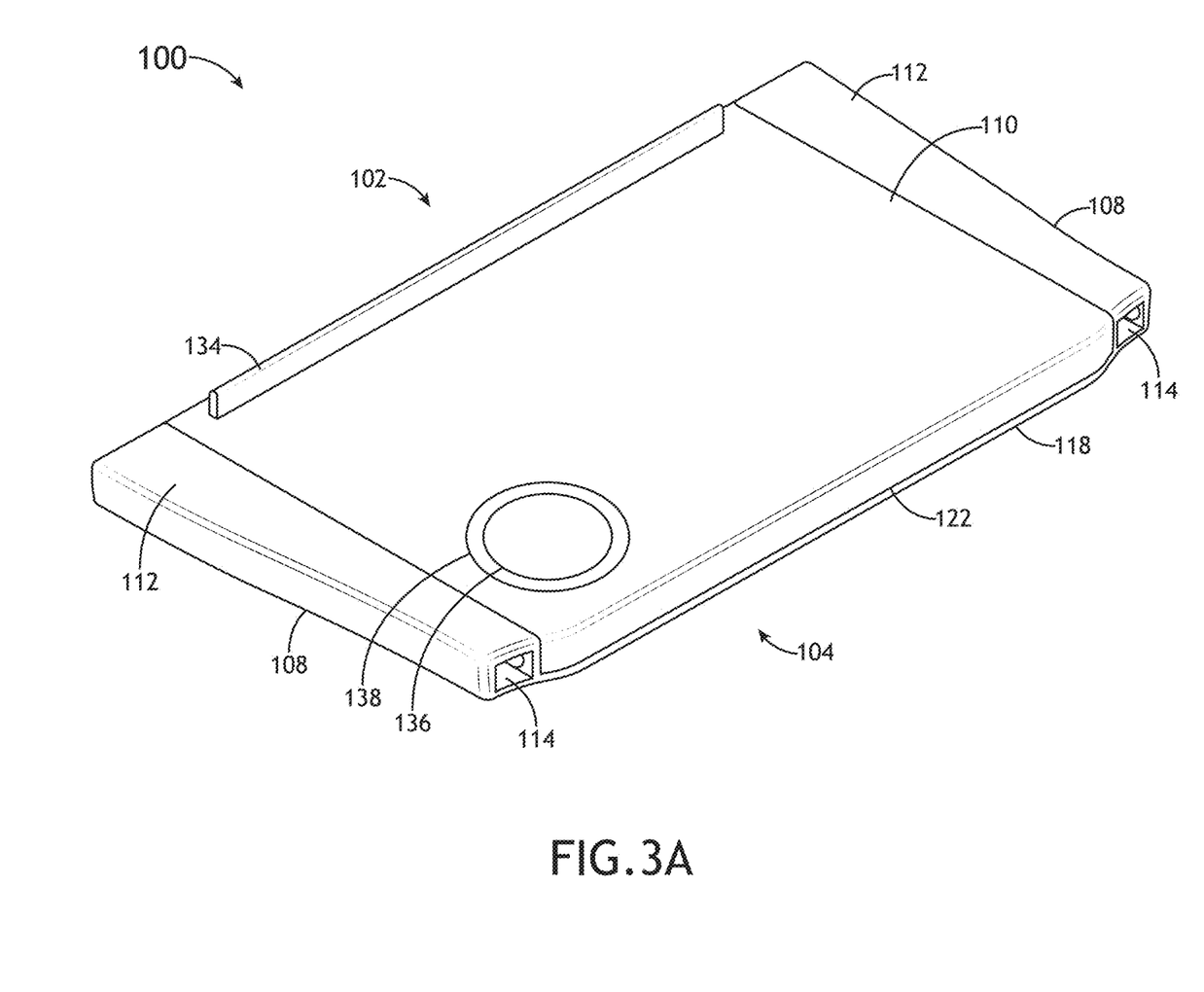
FIG. 3A is a perspective view of an aircraft cabin apparatus including a personal electronic device holder in a closed position, in accordance with one or more embodiments of the disclosure.
Figure 3B:
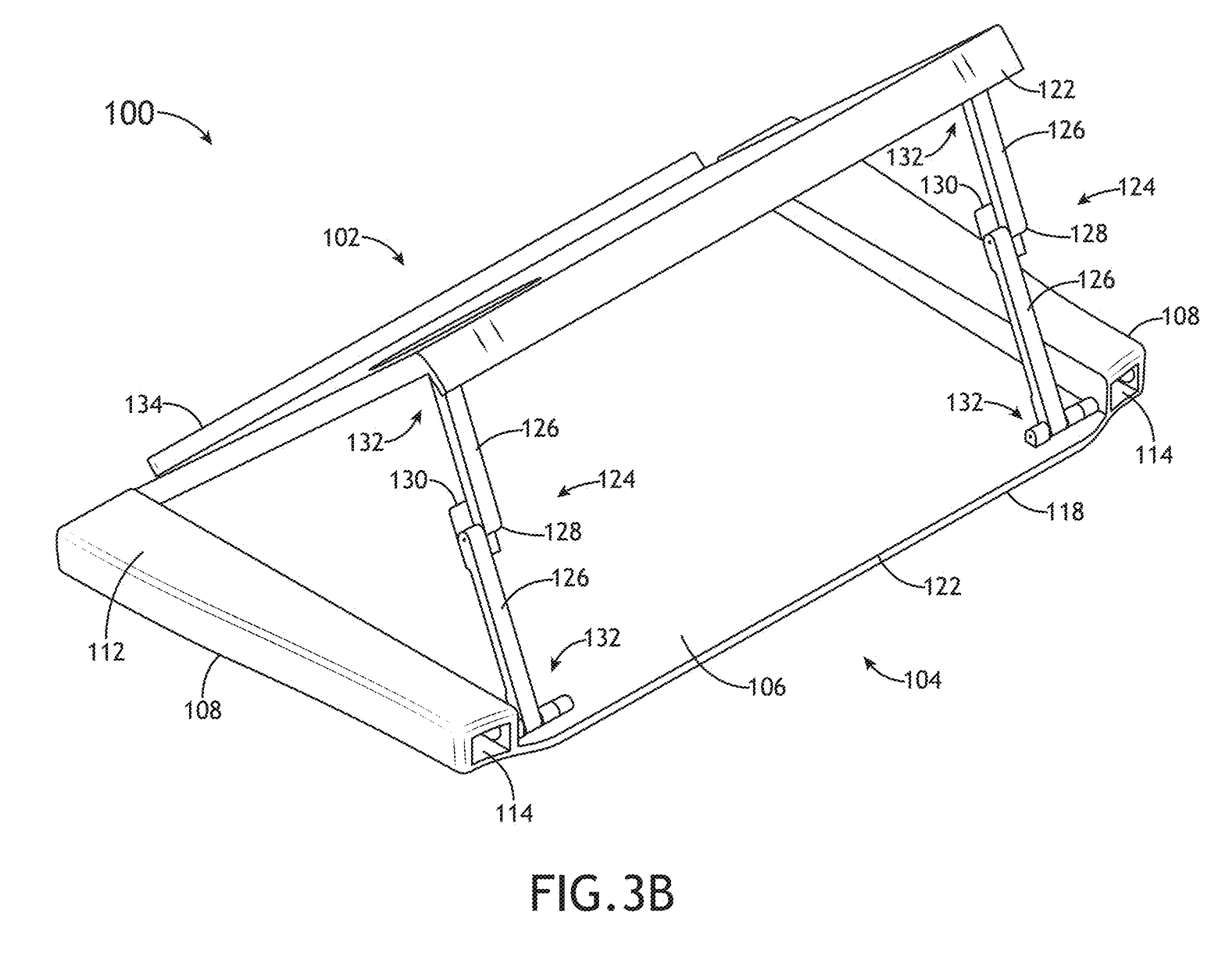
FIG. 3B is a perspective view of an aircraft cabin apparatus including a personal electronic device holder in an open position, in accordance with one or more embodiments of the disclosure.
Figure 4A:
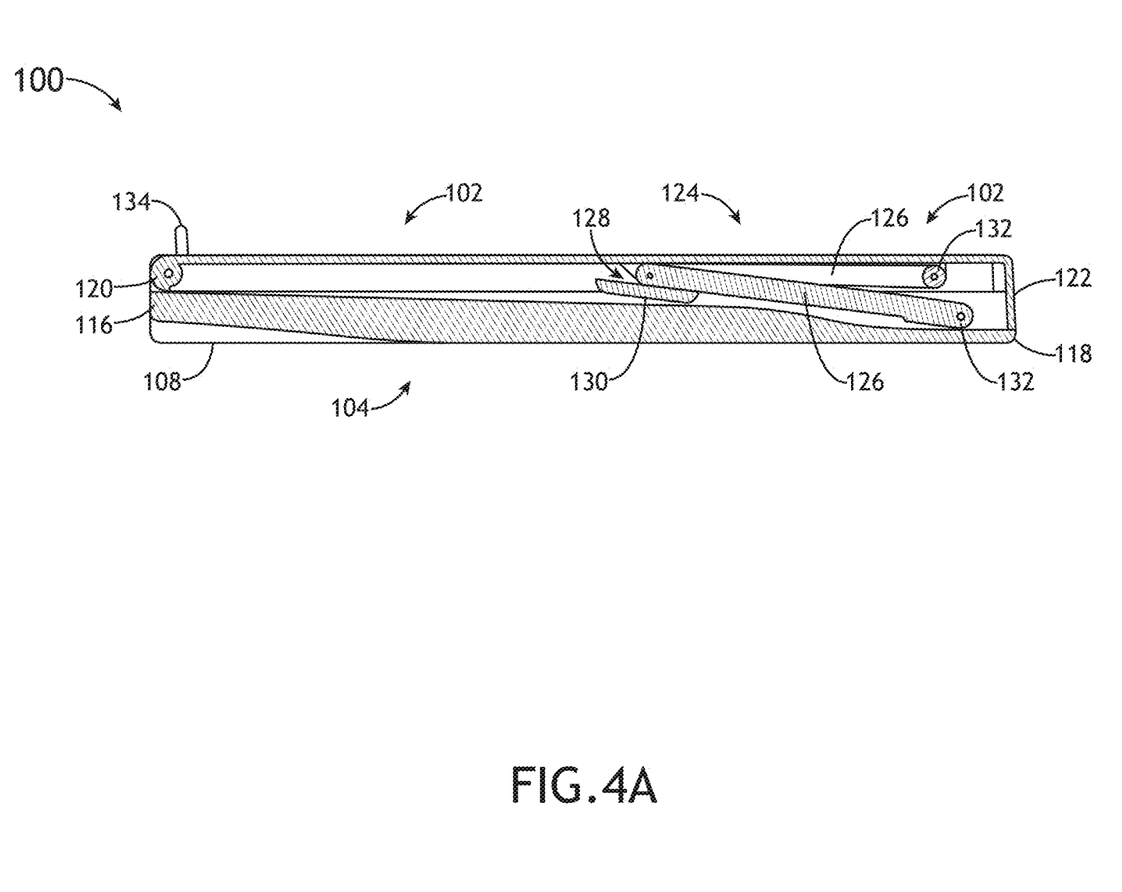
FIG. 4A is a cross-section view of an aircraft cabin apparatus including a personal electronic device holder in a closed position, in accordance with one or more embodiments of the disclosure.
Figure 4B:
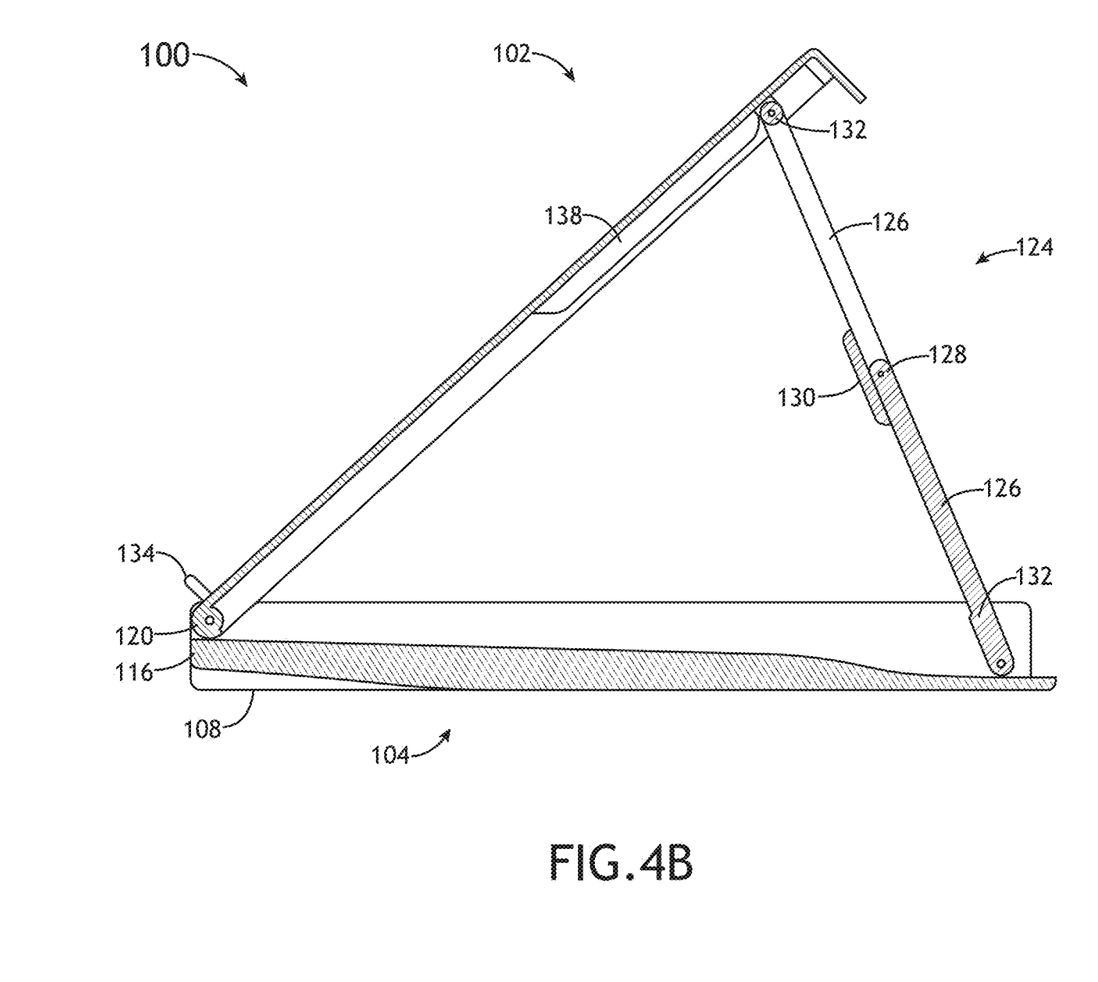
FIG. 4B is a cross-section view of an aircraft cabin apparatus including a personal electronic device holder in an open position, in accordance with one or more embodiments of the disclosure.
Figure 5A:
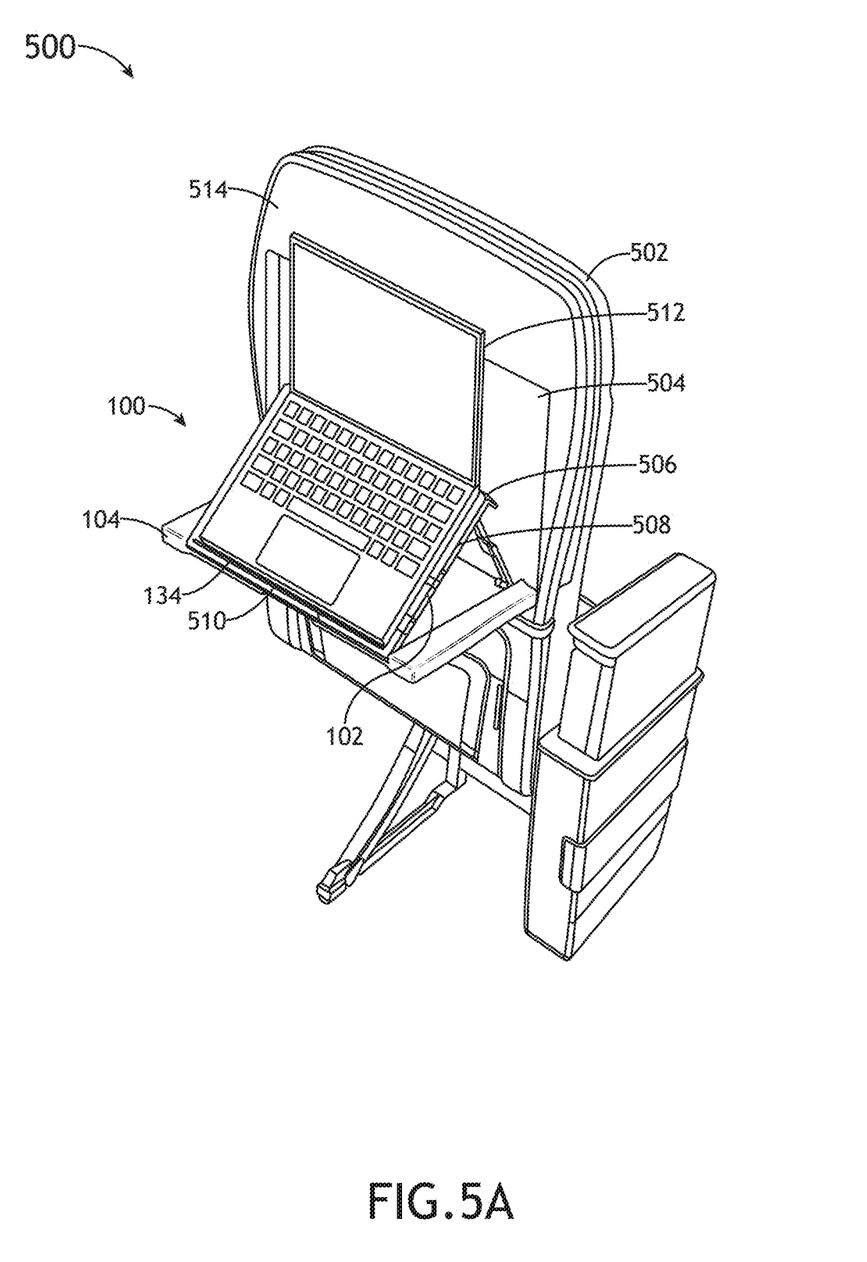
FIG. 5A is a perspective view of a system including an aircraft cabin apparatus including a personal electronic device holder, in accordance with one or more embodiments of the disclosure.
Figure 5B:
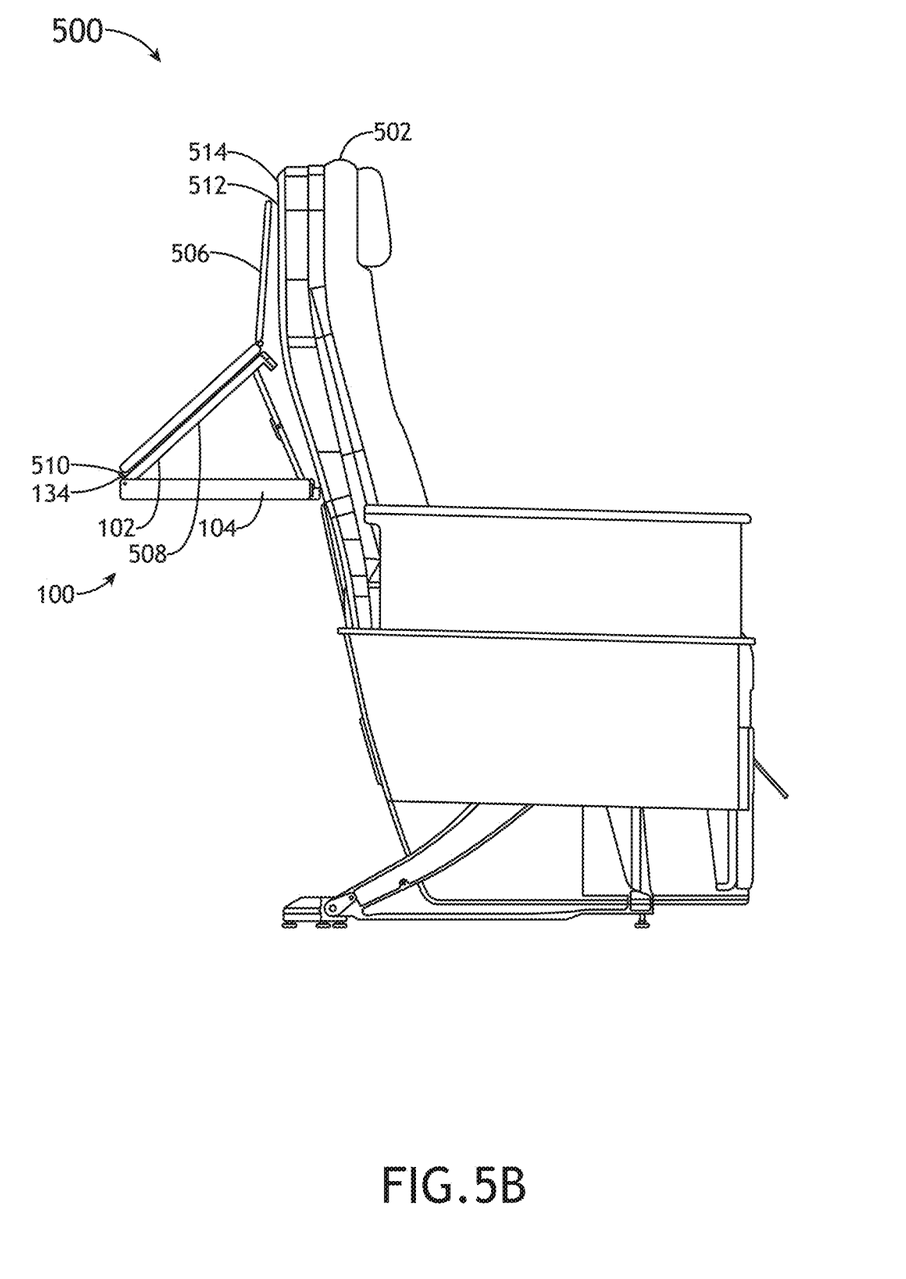
FIG. 5B is a side elevation view of a system including an aircraft cabin apparatus including a personal electronic device holder, in accordance with one or more embodiments of the disclosure.

The apparatus 100 may include a top section 102 and a bottom section 104. The top section 102 may be configured to interact with an edge or surface of a personal electronic device (e.g., a laptop, as illustrated in FIGS. 5A and 5B). In this regard, it is noted herein that "top section 102," "personal electronic device holder 102," and variants of the term "personal electronic device holder 102" (e.g., "PED holder 102, or the like") may be considered equivalent for purposes of the present disclosure.

The top section 102 may be configured to fit within a cavity 106 of the bottom section 104. The cavity 106 may be at least partially bounded or defined by two raised portions 108 of the bottom section 104. For example, the top section 102 may fit within the cavity 106 such that a top surface 110 of the top section 102 may share a plane with (e.g., is flush with) the top surfaces 112 of the two raised portions 108. Where the top section 102 fits within a cavity bounded or defined only by two raised portions 108 of the bottom section 104, the top section 102 may take up the entire length of the apparatus 100 but only a portion of the entire width of the apparatus 100. It is noted herein that the length of the apparatus 100 may be defined by an axis of travel when transitioning from a lowered and collapsed position (meaning the collapsed position is a variation of the lowered position) to a lowered and extended position (meaning the extended position is a variation of the lowered position), while the width of the apparatus 100 may be defined by an axis perpendicular to the axis of travel when transitioning from the collapsed position to the extended position.

The cavity 106 and/or the top surface 110 may include a perimeter of a selected shape. For example, the top surface 110 may include a free-form perimeter that is symmetric when split via a line through the long sides and/or the short sides of the top surface 110. By way of another example, the top surface 110 may include a rectangular (or substantially rectangular) perimeter. By way of another example, the top surface 110 may include a trapezoidal-shaped (or substantially trapezoidal-shaped) perimeter. It is noted herein a length of the top surface 110 may be defined as a distance between the long sides of the top section 102. In addition, it is noted herein a width of the top surface 110 may be defined as a distance between the short sides of the top section 102.

The two raised portions 108 may be positioned on the short edges of the apparatus 100, and may be configured to receive and/or otherwise allow collapsible arms or rails (e.g., to slide the apparatus 100 into the extended position closer to a seat occupant following a folding-down of the apparatus 100 from an raised (e.g., upright or stowed) position to the collapsed position) to pass through a cut-out 114 into a seat arms or rail channel within each of the two raised portions 108.

The top section 102 may be rotatable from a closed position to an open position about an axis proximate to a front surface 116 of the bottom section 104. For example, the top surface 110 of the top section 102 may be flush (or substantially flush) with the top surface 112 of the raised portions 108 of the bottom section 104 when the top section 102 is in the closed position. By way of another example, the top surface 110 of the top section 102 may be at an angle relative to the top section 104 when the top section 102 is in the open position.

It is noted herein the axis proximate to the front surface 116 may run through an axle coupled to one or more hinges. For example, the one or more hinges may include, but are not limited to, friction or torque hinges. For instance, the torque hinge may keep the top section 102 in place and prevent unwanted movement during operation and/or stowage of the apparatus 100. By way of another example, the one or more hinges may include a self-closing (e.g., self-actuating) hinge. For instance, the self-closing hinge may be configured to keep the apparatus 100 in the closed position unless a force is applied to the top section 102 that can overcome the return force provided by the self-closing hinge. By way of another example, the one or more hinges may include a rotation-limited hinge.

The cavity 106 may not be bounded by portions on the front and/or rear of the bottom section 104. For example, the cavity 106 may open (or may be open) to a surrounding environment above the front surface 116 of the bottom section 104 for at least a portion of a front long edge of the bottom section 104, not being bounded by an extension or lip on the front of the bottom section 104. By way of another example, the cavity 106 may open (or may be open) to the surrounding environment above a rear surface 118 of the bottom section 104 for at least a portion of a rear long edge of the bottom section 104, not being bounded by an extension or lip on the front of the bottom section 104. In this regard, a rotation of the top section 102 relative to the bottom section 104 may be unimpeded by an extension or a lip proximate to the front surface 116 and/or the rear surface 118. In addition, the open front and/or rear portions of the cavity 106 being open to the environment may allow for particulates and/or liquid spilled in the cavity 106 to be easily removed (e.g., via wiping, sweeping, dumping, or the like) from the apparatus 100. It is noted herein, however, that the top section 102 may be configured to include an extension or lip 120, 122 proximate to the front surface 116 and/or the rear surface 118, respectively, to offset the lack of extension or lip proximate to the front surface 116 and/or the rear surface 118, where the extension or lip 120, 122 is configured to not impede the rotation of the top section 102 relative to the bottom section 104.

The top section 102 and the bottom section 104 may be coupled together via one or more linkage assemblies 124. A linkage assembly 124 may include a set of arms 126 coupled together via a main hinge assembly 128. The main hinge assembly 128 may include one or more actuation inhibitors configured to prevent the main hinge assembly 128 from actuating (e.g., rotating) beyond a selected angle. For example, the actuation inhibitor may include a plate 130 configured to prevent the main hinge assembly 128 from actuating (e.g., rotating) beyond an angle corresponding to an open position of the top section 102 relative to the bottom section 104 when transitioning (e.g., rotating) from the closed position to the open position. By way of another example, the actuation inhibitor may include a lock joint or ball detent on one or more of the arms 126 of the main hinge assembly 128 configured to prevent the main hinge assembly 128 from actuating (e.g., rotating) without an external force when transitioning (e.g., rotating) from the open position to the closed position.

The arms 126 of the linkage assembly 124 may each be coupled to the top section 102 and the bottom section 104 via a secondary hinge assembly 132. For example, the secondary hinge assemblies 132 may be positioned on a bottom surface of the top section 102 and a top surface of the bottom section 104.

The secondary hinge assemblies 132 may allow for the linkage assembly 124 to collapse and fit within the cavity 106 of the bottom section 104 and underneath the top section 102 when the top section 102 transitions (e.g., rotates) from the open position to the closed position.

The top section 102 may include a support structure 134. For example, the support structure 134 may be coupled to the top surface 110 of the top section 102 (e.g., via one or more interlocking assemblies, fasteners, an adhesive, or the like). By way of another example, the support structure 134 may be integrated with the top surface 110 of the top section 102 (e.g., via one or more fabrication processes). The support structure 134 may be configured to engage an edge or surface of a personal electronic device. For example, an edge or surface of the personal electronic device may sit against the support structure 134 when the top section 102 is in an open position. By way of another example, an edge or surface of the personal electronic device may be configured to at least partially insert within the support structure 134.

The support structure 134 may be a selected shape. For example, the selected shape may include, but is not limited to, at least a portion of a wedge (e.g., triangular prism), a rectangular prism, or other polyhedron known in the art. By way of another example, the selected shape may include, but is not limited to, at least a portion of a capsule (e.g., a cylinder with hemispherical ends) or a spherical cap, such that the support structure 134 does not include a vertical face (e.g., when in the closed position). The support structure 134 may include an exterior edge including, but not limited to, a sharp corner, a chamfered edge (e.g., sloped or angled edge), a filleted edge (e.g., rounded edge), or any other type of edge known in the art.

It is noted herein the top surface 110 and/or the support structure 134 of the top section 102 and/or the raised portions 108 may be coated with one or more friction coatings that provides an additional amount of force against a personal electronic device being held by the apparatus 100 when in the closed position or the open position.

The top surfaces 112 of the raised portions 108 of the bottom section 104 may include support structures proximate to a first side and/or an additional side of the cavity 106 and configured to interact with an edge or surface of a personal electronic device (e.g., a laptop). The support structures on the raised portions 108 may be in line with the support structure 134 on the top surface 110 of the top section 102. The support structures on the raised portions 108 may be unaligned with the support structure 134 on the top surface 110 of the top section 102

It is noted herein the top surfaces 112 and/or the support structures of the raised portions 108 may be coated with one or more friction coatings that provides an additional amount of force against a personal electronic device being held by the apparatus 100 when in the closed position or the open position.

The top surface 110 of the top section 102 may include a recess 136 (e.g., notch, groove, indentation, or the like). The recess 136 may include one or more interior sidewalls 138. The one or more interior sidewalls 138 may be set at an angle relative to the top surface 110 of the top section 102. For example, the angle may be greater than ninety degrees such that the one or more interior sidewalls 138 are slanted outward. For instance, where the recess 136 is a cupholder, the slanted interior sidewalls 138 may allow for an easier cleaning of the cupholder and/or placement of a cup within the cupholder.

Although the recess 136 is illustrated in the top section 102, it is noted herein the top surfaces 112 of the raised portions 108 of the bottom section 104 may include one or more recesses 136. For example, the top section 102 may remain centered within the apparatus 100 but smaller in size to allow for the raised portions 108 to include one or more recesses 136. By way of another example, the top section 102 may be offset to allow for the raised portions 108 to include one or more recesses 136. It is noted herein, however, that the top surfaces 112 of the raised portions 108 may only include the recesses 136 where the recesses 136 do not interfere with the collapsible arms or rails within the seat arms or rail channels behind the cut-out 114.

The bottom section 104 may include a recess 140 (e.g., notch, groove, indentation, or the like). For example, where the apparatus 100 is in the raised position, the recess 140 may be positioned within a bottom surface of the bottom section 104. For example, the recess 140 may be configured to receive a securing device (e.g., a rotatable lever, lock, latch, or the like), where the securing device may engage the recess 140 and hold the apparatus 100 in the raised position.

The recess 136 and/or the recess 140 may be an inward-cut selected shape including, but not limited to, at least a portion of a spherical cap, a wedge (e.g., triangular prism), a rectangular prism, or other polyhedron known in the art. The recess 136 and/or the recess 140 may include an interior edge including, but not limited to, a sharp corner, a chamfered edge (e.g., sloped or angled edge), a filleted edge (e.g., rounded edge), or other types of edges known in the art.

It is noted herein the top section 102 may include two or more sections. For example, the top section 102 may include a main section and an additional section. For instance, the additional section may include a hinged portion configured to rotate about an axis in addition to the rotation of the entire top section 102 about the axis proximate to the front surface 116 of the bottom section 104. The additional section may increase the range of rotation of the top section 102. It is noted herein the additional section may be configured to rotate independently of the rotation of the main section about the axis proximate to the front surface 116 of the bottom section 104. In addition, it is noted herein the additional section may be configured to rotate following the rotation of the main section about the axis proximate to the front surface 116 of the bottom section 104 to its maximum.

In addition, it is noted herein the bottom section 104 and/or the top section 102 may include one or more interior support plates. For example, the interior support plates may be separate from or forming a portion of the top section 102 and/or the bottom section 104.

Further, it is noted herein the top section 102 and the bottom section 104 may include one or more magnets that interact with an interior support plate and/or one or more additional magnets embedded or otherwise positioned within the top section 102 and/or the bottom section 104. In this regard, the magnets may keep the apparatus 100 in the closed position while being rotated from the raised position to the lowered position, and vice versa.

One or more of the various components of the apparatus 100 (e.g., an arm 126 and the plate 130, or select other components) may be fabricated as a single component via one or more fabrication processes from a material including, but not limited to, a plastic or a metal. For example, the one or more fabrication processes may include, but are not limited to, molding (e.g., injection molding, compression molding, or the like), vacuum casting, thermoforming, 3D-printing, metal-casting, machining, cutting, folding, punching, shearing, stamping, or the like. One or more of the various components of the apparatus 100 (e.g., an arm 126 and the plate 130, or select other components) may be separate components coupled together via one or more fabrication processes, an adhesive, one or more component-integrated fasteners, one or more secondary fasteners, or the like.

FIGS. 5A and 5B generally illustrate a system 500 and the aircraft cabin apparatus 100 including the personal electronic device holder 102, in accordance with one or more embodiments of the disclosure.

The system 500 may include any vehicle known in the art. For example, the vehicle may be any air, land, or water-based personal equipment or vehicle; any air, land, or water-based commercial equipment or vehicle; any air, land, or water-based military equipment or vehicle known in the art. For instance, the vehicle may be a passenger aircraft.

Where the vehicle is a passenger aircraft, the apparatus 100 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

The vehicle may include a cabin. For example, where the vehicle is a passenger aircraft, the vehicle may include an aircraft cabin. One or more seats 502 may be installed and/or configured or dimensioned to fit within the cabin. For example, where the vehicle is a passenger aircraft, the apparatus 100 may be attached to an aircraft seat 502 via one or more couplers (e.g., one or more collapsible arms or rails). For example, the apparatus 100 may be a seat back-mounted tray attached to the aircraft seat 502 in front of a second aircraft seat 502 in which a seat occupant using the apparatus 100 may sit. The apparatus 100 may fold into the raised position within a recess 504 of the aircraft seat 502. It is noted herein, however, that the apparatus 100 may be coupled to any surface of the vehicle.

Although the present disclosure is directed to the apparatus 100 being attached to an aircraft seat 502 in a cabin of the vehicle, it is noted herein the apparatus 100 may be attached directly to the vehicle via the one or more couplers. For example, the apparatus 100 may be attached directly to a surface of the cabin. For instance, where the vehicle is a passenger aircraft, the aircraft seat 502 may be located in the first row of the aircraft, such that the apparatus 100 is attached to a wall in front of the cabin seat. By way of another example, where the vehicle is a passenger aircraft, the apparatus 100 may be attached on a surface of an aircraft galley. For instance, the apparatus 100 may be attached to a wall, compartment, counter, or other surface in the aircraft galley. Therefore, the above description should not be interpreted as a limitation on the present disclosure but merely an illustration.

It is noted herein the apparatus 100 may instead be a standalone device. For example, the apparatus 100 may be a desk, table, countertop, or the like. For instance, the apparatus 100 may be installed within the vehicle without being coupled to the aircraft seat 502. In addition, the apparatus 100 may be a device sold for commercial or industrial use in either a home or a business, such that the apparatus 100 may not be installed and/or configured or dimensioned to fit within the vehicle. Therefore, the above description should not be interpreted as a limitation on the present disclosure but merely an illustration.

The seat 502 and the apparatus 100 may be configured to support a personal electronic device 506 when the top section 102 is in the open position. For example, the top surface 110 may support an edge or surface 508 of the personal electronic device 506. By way of another example, the support structure 134 of the top section 102 may support an edge or surface 510 of the personal electronic device 506. An edge or surface 512 of the personal electronic device 506 may be in contact with a rear seat surface 514 of the seat 502 when the personal electronic device 506 is positioned on the apparatus 100.

The personal electronic device 506 may be any electronic device known in the art. For example, the personal electronic device 506 may be any computer or computing device including one or more processors and memory. For instance, the personal electronic device 506 may be a convertible laptop including, but not limited to, a laptop with a single-fold hinge, a laptop with a double-fold hinge, a laptop with a twist-and-fold hinge, a laptop with a detachable display device and/or a detachable user input device, or the like. In addition, the personal electronic device 506 may be a handheld computer including, but not limited to, a tablet, a smartphone, a phablet, or the like.

Where the personal electronic device 506 is a laptop, as illustrated in FIGS. 5A and 5B, the angle of the top section 102 relative to the bottom section 104 may be selected to allow for a screen or display device to be fully open while the laptop is supported by the apparatus 100 by the top section 102. In this regard, the use of the laptop may not be impeded by the position of the aircraft seat 502 to which the apparatus 100 is coupled, whether in the aircraft seat 502 is in a taxi, take off, and landing (TTOL) position (e.g., upright) or a non-TTOL position (e.g., upright or reclined). In addition, the use of the laptop may not be impeded by the size of the seat occupant using the apparatus 100 to support the laptop during the flight.

It is noted herein the one or more processors may include any one or more processing elements known in the art. In this sense, the one or more processors may include any microprocessor device configured to execute algorithms and/or program instructions. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

In addition, it is noted herein the memory may include any storage medium known in the art suitable for storing the set of program instructions executable by the associated one or more processors. For example, the memory may include a non-transitory memory medium. For instance, the memory may include, but is not limited to, a read-only memory (ROM), a random access memory (RAM), a magnetic or optical memory device (e.g., disk), a magnetic tape, a solid state drive, and the like. The memory may be configured to provide display information to the display device (e.g., the personal electronic device 506, where the personal electronic device 506 includes a handheld computer or a convertible laptop; or a portion of the personal electronic device 506, where the personal electronic device 506 includes a display device communicatively coupled to a computer). In addition, the memory may be configured to store user input information from a user input device of a user interface. The memory may be housed in a common controller housing with the one or more processors. The memory may, alternatively or in addition, be located remotely with respect to the spatial location of the processors and/or a controller. For instance, the one or more processors and/or the controller may access a remote memory (e.g., server), accessible through a network (e.g., internet, intranet, and the like).

Further, it is noted herein the controller may be configured to receive and/or acquire data or information from other systems or tools by a transmission medium that may include wireline and/or wireless portions. In addition, the controller may be configured to transmit data or information (e.g., the output of one or more procedures of the inventive concepts disclosed herein) to one or more systems or tools by a transmission medium that may include wireline and/or wireless portions. In this regard, the transmission medium may serve as a data link between the controller and the other subsystems. In addition, the controller may be configured to send data to external systems via a transmission medium (e.g., network connection).

Further, it is noted herein the display device may include any display device known in the art. For example, the display device may include, but is not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

Further, it is noted herein the user input device may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Further, it is noted herein the display device may be coupled to the user input device. For example, the display device may be coupled to the user input device by a transmission medium that may include wireline and/or wireless portions. The display device and/or the user input device may be a component of the user interface.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An apparatus for an aircraft cabin of an aircraft, comprising:
   a top section, comprising:
      a top surface configured to engage a first edge or surface of a laptop; and
      a support structure proximate to the top surface, the support structure configured to engage a second edge or surface of the laptop;
   a bottom section, comprising:
      two raised portions along each short edge of an outer perimeter of the bottom section, each of the two raised portions being configured to receive a corresponding tray arm of a set of tray arms coupled to an aircraft seat, the aircraft seat installed in the aircraft cabin of the aircraft; and
      a cavity defined between the two raised portions, the cavity open to a surrounding environment for at least a portion of each long edge of the outer perimeter of the bottom section when the top section is in an open position; and
   at least one linkage assembly configured to support the top section in the open position following a rotation of the top section relative to the bottom section between a closed position and the open position,
   the top section being configured to fit within the cavity defined within the bottom section when in the closed position, the top surface of the top section being flush with a top surface of each of the two raised portions when the top section is within the cavity defined within the bottom section when in the closed position, the top surface of each of the two raised portions being at least a width of the corresponding tray arm of the set of tray arms to allow for the receiving of the corresponding tray arm of the set of tray arms by each of the two raised portions,
   the top section being set at an angle relative to the bottom section when in the open position.

2. The apparatus of claim 1, the top section including at least one lip configured to separate the cavity from the surrounding environment on at least one long edge of the outer perimeter of the bottom section when the top section is within the cavity defined within the bottom section when in the closed position, the at least one lip configured to open the cavity to the surrounding environment when the top section is in the open position.

3. The apparatus of claim 1, the at least one linkage assembly comprising:
   one or more arms, each arm of the one or more arms coupled to a surface of the top section or the bottom section via a hinge assembly.

4. The apparatus of claim 3, the one or more arms including a first arm and a second arm coupled together via a main hinge assembly, the first arm and the second arm being side-by-side when the top section is within the cavity defined within the bottom section when in the closed position, the first arm being coupled to the top section via a secondary hinge assembly and the second arm being coupled to the bottom section via another secondary hinge assembly.

5. The apparatus of claim 4, the at least one linkage assembly further comprising:
an actuation inhibitor configured to prevent the main hinge assembly coupling the two arms together from actuating beyond a selected angle.

6. The apparatus of claim 5, the actuation inhibitor configured to prevent the main hinge assembly coupling the two arms together from actuating beyond a selected angle when the top section rotates from the closed position to the open position.

7. The apparatus of claim 5, the actuation inhibitor configured to prevent the main hinge assembly coupling the two arms together from actuating from the open position to the closed position without an external force.

8. The apparatus of claim 1, the linkage assembly configured to collapse into the cavity defined by the bottom section and underneath the top section when the top section rotates from the open position to the closed position.

9. The apparatus of claim 1, the apparatus being configured to transition between a raised position and a lowered position via the set of tray arms.

10. The apparatus of claim 9, the apparatus being configured to transition between a collapsed position and an extended position via the set of tray arms, the collapsed position and the extended position each being variations of the lowered position.

11. The apparatus of claim 1, the support structure being integrated with the top surface via one or more fabrication processes.

12. The apparatus of claim 1, the support structure being coupled to the top surface via at least one of an interlocking assembly, a fastener, or an adhesive.

13. An apparatus for a vehicle, comprising:
a top section, comprising:
a top surface configured to engage a first edge or surface of a personal electronic device; and
a support structure proximate to the top surface, the support structure configured to engage a second edge or surface of the personal electronic device;
a bottom section, comprising:
two raised portions along each short edge of an outer perimeter of the bottom section, each of the two raised portions being configured to receive a corresponding tray arm of a set of tray arms coupled to a surface within the vehicle; and
a cavity defined between the two raised portions, the cavity open to a surrounding environment for at least a portion of each long edge of the outer perimeter of the bottom section when the top section is in an open position; and
at least one linkage assembly configured to support the top section in the open position following a rotation of the top section relative to the bottom section between a closed position and the open position,
the top section being configured to fit within the cavity defined within the bottom section when in the closed position, the top surface of the top section being flush with a top surface of each of the two raised portions when the top section is within the cavity defined within the bottom section when in the closed position, the top surface of each of the two raised portions being at least a width of the corresponding tray arm of the set of tray arms to allow for the receiving of the corresponding tray arm of the set of tray arms by each of the two raised portions,
the top section being set at an angle relative to the bottom section when in the open position.

14. The apparatus of claim 13, the vehicle comprising an aircraft, the apparatus being installed within an aircraft cabin of the aircraft, the personal electronic device comprising a laptop.

15. The apparatus of claim 13, the support structure extending outward from a plane defined by the top surface of the top section when the top section is within the cavity defined within the bottom section when in the closed position.

\* \* \* \* \*